United States Patent Office
3,121,790
Patented Feb. 18, 1964

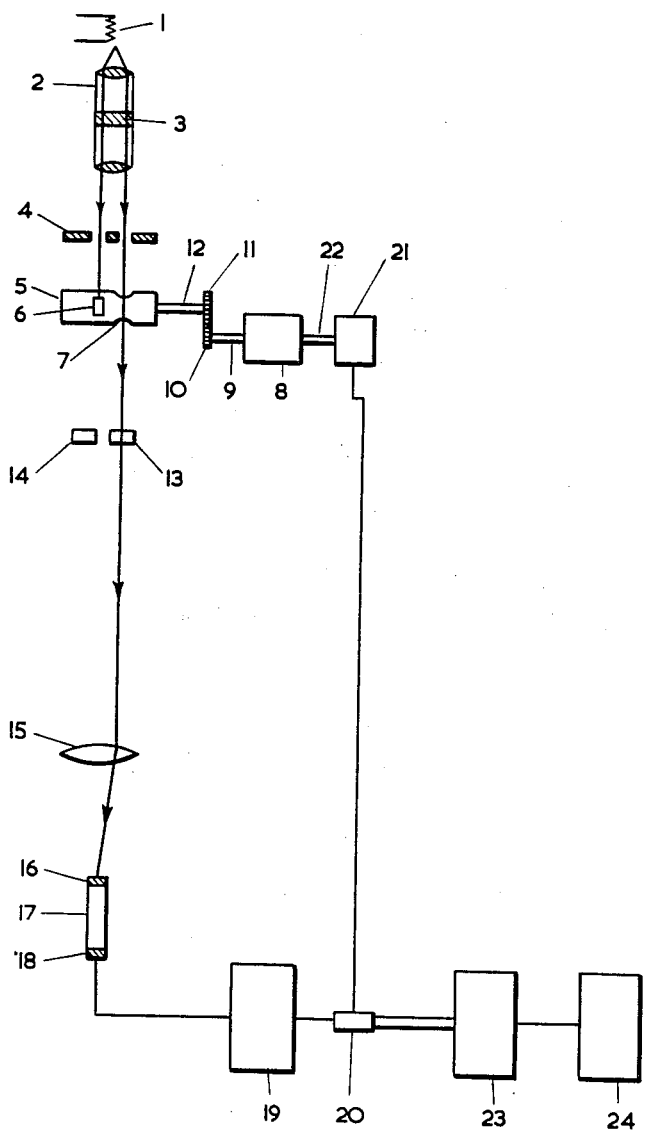

3,121,790
INFRARED ANALYSER WITH SIGNAL RATIO INDICATING MEANS
Charles Walter Munday, Croydon, and Michael Henry Spearing, Epsom Downs, England, assignors to The Distillers Company Limited, Edinburgh, Scotland, a British company
Filed Sept. 20, 1960, Ser. No. 57,332
Claims priority, application Great Britain Oct. 9, 1959
9 Claims. (Cl. 250—43.5)

The present invention relates to analysers, and in particular to radiation fluid analysers.

Radiation analysers have previously been described, but generally it is found that they suffer from long term instability and other disadvantages of performance.

It is the purpose of the present invention to provide a radiation fluid analyser of improved performance.

Accordingly the present invention is a radiation fluid analyser which comprises a source of radiation producing a radiant beam, means for splitting the beam into two beams, a sample cell containing the fluid to be analysed, means for sequentially chopping said beams, a detector system to which the beams are sequentially presented, means for discriminating between the signals induced by each of the beams at the detector, means for amplifying and converting each of the signals to a D.C. signal and means for measuring the ratio of one of said D.C. signals with respect to the other.

By the use of ratio detection in radiation fluid analysers greater accuracy is obtained than has hitherto been easily achieved. Thus, for example, variation in source intensity and detector gain have little effect.

The radiation fluid analysers of the present invention include, for example, ultra-violet liquid and gas analysers, visible spectrum liquid and gas analysers and infra-red liquid and gas analysers. In the infra-red liquid or gas analyser the fundamental absorption wave lengths can be used or if desired the harmonics of these wave lengths can be used as described in British Patent No. 781,972.

The invention will now be more fully described as it relates to one particular class of instruments, namely infra-red liquid analysers in which the overtones of the fundamental absorption wave length are measured. In this context, the overtone region is defined substantially as occurring in the region 0.8–2.7 microns.

In the infra-red liquid analyser according to the present invention, any source of infra-red radiation may be used, for example a hot wire element. It is preferred to use a tungsten lamp. The radiation from the source is suitably passed through a collimator to provide a parallel beam.

As the means whereby the infra-red beam is split into two beams and the two beams are sequentially chopped, it is preferred to use a double aperture plate as the splitter, and a chopper such as a perforated disc, belt or cylinder. It is particularly preferred to use as the chopper a cylinder placed in the beam such that the longitudinal axis of the cylinder is at right angles to the beam, the cylinder having two passages the longitudinal axes of which are at right angles to each other and to the longitudinal axis of the cylinder. The chopper may be driven by any suitable means. It is preferred to use a synchronous electric motor for this purpose.

In one preferred method of operation, termed the reference cell method, one beam of the split and chopped radiation is then passed through a reference cell containing the standard solution upon which the analysis is to be based, and the other beam is passed through a sample cell through which is continuously passed the liquid under analysis. The cells may be made of any suitable material transparent to infra-red radiation. It is preferred to use quartz cells. The shape of the cells is not critical, and they may be, for example, of tubular or cubic form. The emergent beams are then directed on to a detector element responsive to infra-red radiation. To ensure that the detector system responds only in the overtone region and not to the fundamental absorption wave lengths of the component of the liquid being analysed, the detector used can be so selected that it only responds to the wave lengths in the overtone region, or filters can be introduced into the infra-red beam which only transmit the required wave length band. It is preferred to use in combination a detector responsive only to the required range of wave lengths and a filter which transmits only the required wave length band. This ensures maximum selectivity and sensitivity to the desired radiation. It is particularly preferred to use germanium filters and multilayer all dielectric filters in combination, together with a lead sulphide detector. Broad band filters can be introduced at any part of the path length of the beams, but it is preferred to introduce narrow band filters into that part of the path length of the beam which is parallel.

By using absorption in the overtone region only, sample and reference cells of relatively large path length may be employed, thus avoiding difficulties associated with the use of cells of very small path length.

In another preferred method of operation, termed the reference wave length method, each beam of the split and chopped radiation is passed through a cell through which the liquid under analysis is continuously passed. Before being presented to the detector element, one beam, the analysis beam, is filtered such that only the overtone absorption wave length band of the component of the liquid being measured is transmitted. The other beam, the reference beam, is filtered such that only a selected wave length band within the overtone region is transmitted, at which no substantial absorption by the component of the liquid being measured takes place. In selecting the wave length of the reference beam, any powerful absorption band of any of the components of the liquid under analysis should be avoided. It is preferred to use as filters, germanium filters and multilayer all dielectric filters in combination, and as the detector, a lead sulphide detector.

One particularly preferred instrument is arranged such that it can rapidly be adapted for use in the reference cell method or the reference wave length method. In this instrument two cells, the reference cell and the sample cell when the reference cell method is in use, are arranged so that they can easily be connected together by means of a tube, and thus become a single large sample cell, with two windows, through which the liquid under analysis is continuously passed when the reference wave length method is in use. The filters are arranged so that they likewise can readily be changed over dependent upon whether it is desired to use the reference cell or reference wave length technique.

If the response of the detector to radiation varies from point to point of the detector surface, as for example with a lead sulphide detector, it is necessary to scramble the radiation prior to presenting it to the detector. Suitable scramblers such as a ground glass screen placed immediately in front of the detector may be used. It is preferred to use a scrambler comprising a lens, a ground glass screen, and a hollow tube of highly reflective internal surface, for example made of highly polished metal. It is particularly preferred that the ground glass screen is ground on both surfaces, and that the hollow tube is cylindrical in form. The radiation is focussed onto the outer surface of the ground glass plate by means of the lens, passes through the ground glass plate and down the hollow tube before striking the detector. The scattering effect of the ground glass screen combined with the multiple internal reflections upon the tube thus arising from its highly polished interior surface, give rise to a beam of uniform intensity throughout its cross section before the beam reaches the detector. This obviates errors arising from lack of uniform response throughout the surface of the detector. The output signal from the detector is then amplified. Any suitable amplifier may be used for this purpose.

The output from the amplifier is fed to a phase discriminator system. Any suitable system for discriminating between the signals arising from each of the two beams may be used. It is preferred to use a synchronous switch operated by a reference voltage A.C. generator driven by the motor driving the chopper. By this means the synchronous switch can be operated at the same frequency as, and in phase with, the frequency of chopping.

The output from the amplifier is thus separated into two components, each component arising from one of the chopped beams.

The separated signals are then suitably converted into smoothed D.C. signals, and each signal is then fed into a ratio detector apparatus. It is preferred to use in combination with the ratio detector a modified potentiometric recorder, such that the ratio of the two D.C. signals presented to it is continuously recorded. In this manner a continuous record is kept of the ratio of the two signals which in turn is a direct measure of the concentration of the component of the liquid under analysis in the sample cell of the apparatus.

The invention will be further understood by reference to the figure, which represents a schematic layout of one preferred form of an infra-red liquid analyser operating in the overtone region. The specific embodiment to be described is particularly applicable to the measurement of water in acetone.

Radiation from a tungsten lamp 1 is passed through a collimator 2 which contains a filter 3 comprising a germanium disc and a multilayer all dielectric filter. The combined filters only pass infra-red radiation of wave length of 1.45 microns. Water has a characteristic overtone absorption band at this wave length, whereas acetone has only a small background absorption. The parallel beam of radiation emerging from the collimator is passed through the double aperture plate 4, thus defining two beams. The rotary cylindrical chopper 5, contains holes 6 and 7 disposed at right angles to each other, thus sequentially chopping the two beams. The chopper is driven by a synchronous electric motor 8 via shaft and gear wheel 9 and 10 and gear wheel and shaft 11 and 12. Motor 8 turns at 50 revolutions per second. In order to provide a double beam chopped radiation of the same frequency, using the rotary cylindrical chopper 5, gear wheels 10 and 11 are in 1:2 ratio.

One beam of the split and chopped radiation is passed through the cell 13, which contains pure acetone as a reference standard. The other beam is passed through cell 14, through which is continuously passed the acetone/water mixture whose water content is to be determined. The emergent beams from these two cells are focused by lens 15 on to the scrambler device. This comprises a ground glass diffusing screen 16 placed in front of a cylindrical brass tube 17 of highly polished internal surface. After passing through the scrambler device the radiation strikes a lead sulphide detector 18 placed immediately behind the cylindrical brass tube.

The electrical signal produced by the radiation striking the lead sulphide detector 18, is passed to an amplifier 19 where the signal is suitably amplified.

The amplified signal is fed to a synchronous switch 20 operated by A.C. generator 21. A.C. generator 21 is directly driven by motor 8 via shaft 22. A.C. generator 21 is designed to produce one complete A.C. phase per revolution. The generator is mounted in relation to the motor and chopper such that the change of phase produced by the chopper in the infra-red beam coincides with a change of phase in the generator. Thus synchronous switch 20 is operated each time the phase changes in the infra-red radiant beam. By this means the signal supplied by amplifier 19 to the synchronous switch is discriminated into two signals, one arising as a result of the passage of an infra-red beam through the sample cell, and the other arising as a result of the passage of an infra-red beam through the reference cell. In practice, in order to obtain this synchronisation, it is necessary to offset the phase of A.C. generator 21 in relation to chopper 5, because there is a slight phase lag of the signal emerging from the amplifier compared with the signal supplied to it. This lag must be corrected by appropriately phasing A.C. generator 21 in relation to the chopper.

The two separated signals emerging from the synchronous switch are fed to the ratio detector 23 where each is integrated to provide a steady D.C. signal. The ratio detector further measures the ratio between the two D.C. signals and is connected to recorder 24 where a continuous chart record is displayed. The chart record display is a direct measure of the ratio of the two D.C. signals which have arisen through passage of the infra-red beam through sample cell and reference cell. It is thus a direct measure of the water content of the acetone passed through the sample cell, and by suitable calibration can be made to read as a direct percentage of water in the acetone.

The instrument described above can rapidly be adapted to use in the reference wave length method by connecting the cells 13 and 14 with a tube and passing the acetone/water mixture through the cells in series. Filter 3 is removed and placed at any point in the parallel path of the radiant beam which passes through cell 14, that is at any point between the twin aperture plate 4 and lens 15. Another filter is placed at any point between plate 4 and lens 15 in the path of the beam which passes through cell 13. This filter must pass radiation in the overtone region excluding the overtone wave length at which water absorbs strongly, or any overtone wave length at which acetone absorbs strongly. This beam, therefore, becomes the reference wave length beam.

While the fluid analyser hereof has been described with particular reference to the use of infra-red radiation in the overtone region, it is to be understood that visible or ultra-violet radiation, or infra-red radiation in the fundamental region, may be employed without departing from the spirit of the invention.

We claim:

1. A radiation fluid analyser which comprises a source of radiation producing a radiant beam, means for splitting the beam into two beams, a sample cell containing the fluid to be analysed, said cell being placed in the path of one of said beams, means for sequentially chopping said beams, a detector having a common beam responsive detecting element which provides signals in response to energy of said beams, means for supplying both said beams in succession to the same said element, said one beam being supplied to said element after passing through said sample cell, means for discriminating between the signals induced by each of the beams at the detector, means for amplifying and converting each of the signals to a D.C. signal and means for measuring the ratio of one of said D.C. signals with respect to the other.

2. An infra-red radiation fluid analyser which comprises a source of radiation producing an infra-red beam, means for splitting the beam into two beams, a sample cell containing the fluid to be analysed, said cell being placed in the path of one of said beams, means for sequentially chopping said beams, a detector having a common beam responsive detecting element which provides signals in response to energy of said beams, means for supplying both said beams in succession to the same said element, said one beam being supplied to aid element after passing through said sample cell, means for ensuring that the detector system responds to the overtones and not to the fundamental absorption wave lengths of the fluid under analysis, means for discriminating between the signals induced by each of the beams at the detector, means for amplifying and converting each of the signals to a D.C. signal and means for measuring the ratio of one of said D.C. signals with respect to the other.

3. An infra-red radiation fluid analyser according to claim 2 in which the means for ensuring that the detector system responds to the overtones and not to the fundamental absorption wave lengths of the fluid under analysis comprise filters placed in the infra-red beam.

4. An infra-red radiation fluid analyser according to claim 3 wherein the filters are germanium filters in combination with multilayer all dielectric filters.

5. An infra-red radiation fluid analyser according to claim 2 wherein the detector system comprises a lead sulphide detector.

6. An infra-red radiation fluid analyser according to claim 2 wherein a scrambler is used in combination with the detector.

7. An infra-red radiation fluid analyser according to claim 6 wherein the scrambler comprises in combination a lens, a ground glass screen and a hollow tube of highly reflective internal surface.

8. An infra-red radiation fluid analyser according to claim 7 wherein the ground glass screen is ground on both surfaces and the hollow tube is cylindrical in form.

9. A radiation fluid analyser comprising means for producing a pair of spaced radiant energy beams, a sample cell containing the fluid to be analysed mounted in the path of one of said beams and a reference cell mounted in the path of other of said beams, means in the paths of said beams for sequentially chopping said beams, a detector having a detecting element responsive to the energy of said beams for generating signals in response to receipt of energy from said beams, means for supplying both said beams after passage through said cells and said chopping means to the same said element, and means connected to said detector for indicating the ratio of the signal produced by said element in response to one of said beams to the signal produced by said element by the other of said beams.

References Cited in the file of this patent

UNITED STATES PATENTS

| | | |
|---|---|---|
| 1,746,525 | Darrah | Feb. 11, 1930 |
| 1,999,023 | Sharp et al. | Apr. 23, 1935 |
| 2,547,212 | Jamison et al. | Apr. 3, 1951 |
| 2,650,307 | Koppins | Aug. 25, 1953 |
| 2,775,160 | Foskett et al. | Dec. 25, 1956 |
| 2,810,835 | Miller | Oct. 22, 1957 |
| 2,824,235 | Hahn et al. | Feb. 18, 1958 |
| 2,938,118 | Martin | May 24, 1960 |
| 2,951,939 | Luft | Sept. 6, 1960 |